United States Patent
Watanabe (10) Patent No.: US 12,112,779 B1
(45) Date of Patent: Oct. 8, 2024

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Toru Watanabe, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/236,903

(22) Filed: Aug. 22, 2023

(30) Foreign Application Priority Data

Mar. 23, 2023  (JP) .................................. 2023-046831

(51) Int. Cl.
*G11B 5/60* (2006.01)

(52) U.S. Cl.
CPC ............ *G11B 5/607* (2013.01); *G11B 5/6011* (2013.01); *G11B 5/6029* (2013.01)

(58) Field of Classification Search
None
See application file for complete search history.

(56) References Cited

U.S. PATENT DOCUMENTS

| | | | | |
|---|---|---|---|---|
| 4,384,311 A | * | 5/1983 | McNeil | G11B 5/41 360/137 |
| 5,612,830 A | * | 3/1997 | Gregory | G11B 23/505 360/71 |
| 5,831,781 A | * | 11/1998 | Okamura | G11B 5/6005 |
| 5,909,330 A | * | 6/1999 | Carlson | G11B 5/6029 360/75 |
| 7,274,639 B1 | * | 9/2007 | Codilian | G11B 20/1883 369/53.17 |
| 9,047,902 B1 | | 6/2015 | Tu et al. | |
| 9,799,358 B2 | | 10/2017 | Kiely et al. | |
| 11,074,936 B2 | | 7/2021 | Watanabe et al. | |
| 2006/0044658 A1 | * | 3/2006 | Ma | G11B 5/455 |
| 2007/0268613 A1 | * | 11/2007 | Fitzpatrick | G11B 5/02 360/60 |
| 2008/0043363 A1 | * | 2/2008 | Yamashita | G11B 5/607 |
| 2009/0296262 A1 | * | 12/2009 | Ikeda | G11B 5/6005 360/75 |

* cited by examiner

*Primary Examiner* — Peter Vincent Agustin
(74) *Attorney, Agent, or Firm* — Maier & Maier, PLLC (57) ABSTRACT

According to one embodiment, a magnetic disk device includes a magnetic disk, a magnetic head that includes a write head configured to write data to the magnetic disk, a read head configured to read data from the magnetic disk, and a heater configured to adjust a flying height of the write head, and a controller that includes a first detection unit configured to detect the flying height of the write head, a second detection unit configured to detect a positioning error of the magnetic head with respect to a track of the magnetic disk, and a memory configured to store a first threshold and a second threshold.

2 Claims, 9 Drawing Sheets

MAGNETIC DISK DEVICE

CROSS-REFERENCE TO RELATED APPLICATIONS

This application is based upon and claims the benefit of priority from Japanese Patent Application No. 2023-046831, filed Mar. 23, 2023, the entire contents of which are incorporated herein by reference.

FIELD

Embodiments described herein relate generally to a magnetic disk device.

BACKGROUND

A magnetic disk device includes a magnetic disk and a magnetic head. In order to improve recording density, particularly linear recording density, a magnetic disk device needs to reduce a gap (flying height) between the magnetic head and the magnetic disk. Thus, a technique in which the magnetic head includes a heater and the heater performs operations such as writing and reading at a desired flying height is used.

A contamination generated by a manufacturing procedure of the magnetic disk device or gas generation in the magnetic disk device may adhere to the magnetic disk. In a case where the contamination adheres to the magnetic head, even though there is an attempt to control the flying height by the heater, the flying height does not become a desired flying height, recording quality and reproduction quality deteriorate, and a function of the magnetic disk device may be impaired.

DETAILED DESCRIPTION

Embodiments will be described hereinafter with reference to the accompanying drawings.

In general, according to one embodiment, a magnetic disk device includes a magnetic disk, a magnetic head that includes a write head configured to write data to the magnetic disk, a read head configured to read data from the magnetic disk, and a heater configured to adjust a flying height of the write head, and a controller that includes a first detection unit configured to detect the flying height of the write head, a second detection unit configured to detect a positioning error of the magnetic head with respect to a track of the magnetic disk, and a memory configured to store a first threshold and a second threshold. The controller supplies power of a predetermined power value to the heater such that the flying height of the write head becomes a desired flying height when data is written to the magnetic disk by the write head, detects the flying height of the write head by the first detection unit, detects the positioning error of the write head by the second detection unit, and increases the power value of the power supplied to the heater in a case where the flying height of the write head exceeds the first threshold and the positioning error of the write head exceeds the second threshold.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

Hereinafter, a magnetic disk device according to an embodiment will be described in detail with reference to the drawings.

Figure 1:
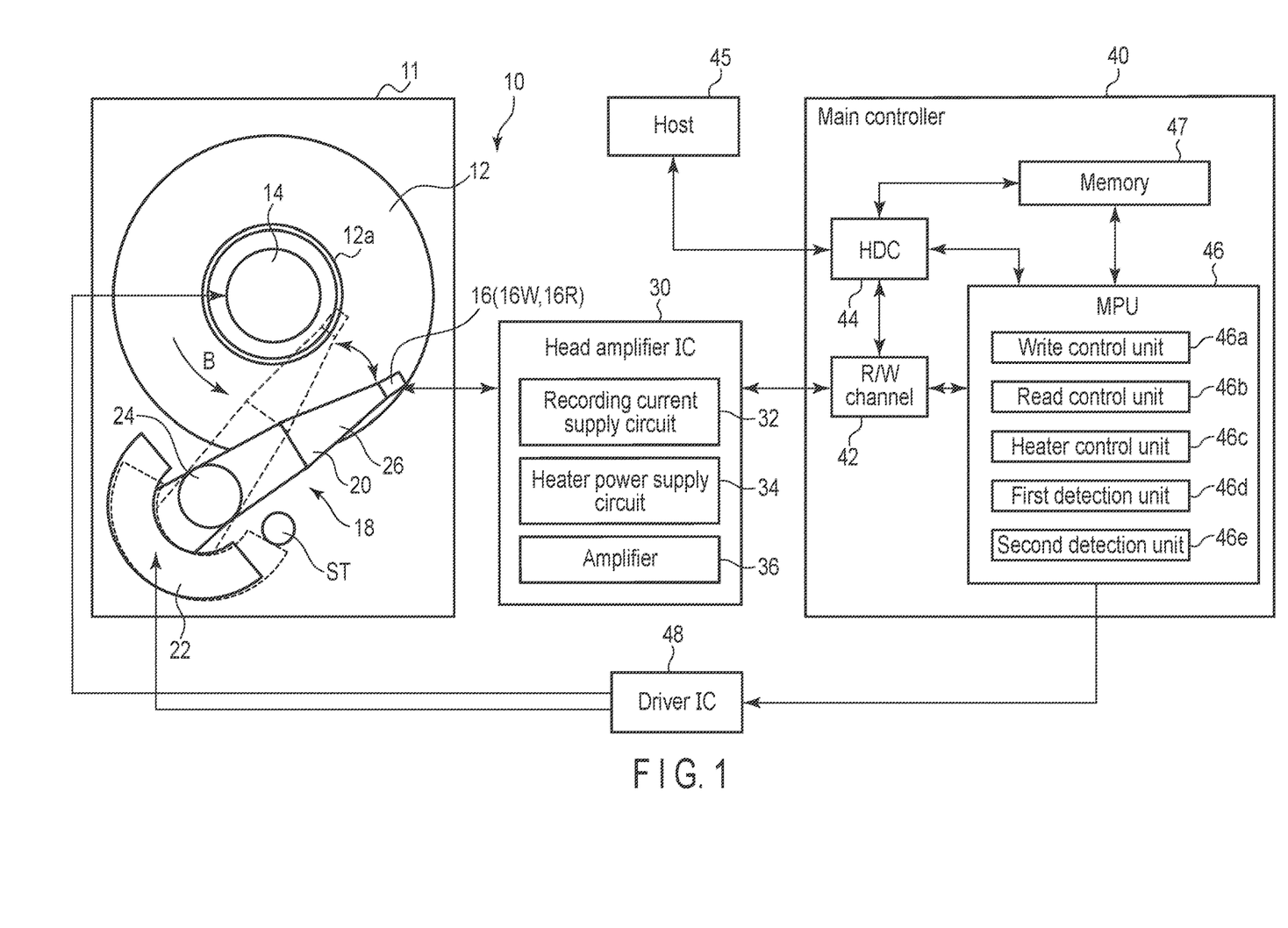
FIG. 1 is a block diagram illustrating a configuration of a magnetic disk device according to an embodiment.

FIG. 1 is a block diagram illustrating a configuration of a magnetic disk device 10 according to the embodiment.

As illustrated in FIG. 1, the magnetic disk device 10 includes a rectangular housing 11, a magnetic disk 12 as a recording medium disposed in the housing 11, a spindle motor 14 that supports and rotates the magnetic disk 12, and a plurality of magnetic heads 16 that write (record) and read (reproduce) data to and from the magnetic disk 12.

The magnetic disk device 10 includes a head actuator 18 that moves and positions the magnetic heads 16 to any track on the magnetic disk 12. The head actuator 18 includes a carriage assembly 20 that movably supports the magnetic heads 16, and a voice coil motor (VCM) 22 that pivots the carriage assembly 20.

The carriage assembly 20 includes a bearing 24 pivotably supported by the housing 11 and a plurality of suspensions 26 extending from the bearing 24. The magnetic head 16 is supported by a distal end of each suspension 26.

The magnetic disk device 10 includes a stopper ST that limits the movement of the magnetic head 16. In one example, the stopper ST prevents the magnetic head 16 from moving too far toward an inner peripheral side with respect to the magnetic disk 12. Specifically, the stopper ST prevents the magnetic head 16 from coming into contact with the spindle motor 14 by coming into contact with the VCM 22 that pivots about the bearing 24.

The magnetic disk 12 has a contamination removing track 12a. The magnetic head 16 does not write data to the contamination removing track 12a or read data from the contamination removing track 12a. Note that, the magnetic disk 12 may not include the contamination removing track 12a. In one example, in a case where the movement of the magnetic head 16 is limited by the stopper ST, the contamination removing track 12a is positioned on an inner peripheral side of the magnetic disk 12 such that the magnetic head 16 is positioned on the contamination removing track 12a. Note that, a position where the contamination removing track 12a is disposed is not limited to the above position, and may be positioned on, for example, an outer circumferential side.

The magnetic disk device 10 includes a head amplifier IC (preamplifier) 30 that drives the magnetic heads 16, a main controller 40, and a driver IC 48. The head amplifier IC 30 is electrically connected to the magnetic head 16. The head amplifier IC 30 includes a recording current supply circuit 32 that supplies a recording current to a recording coil of the magnetic head 16, a heater power supply circuit 34 that supplies power to heaters H to be described later, and an amplifier 36 that amplifies a signal read by the magnetic head 16.

The main controller 40 and the driver IC 48 are formed as, for example, a control circuit board (not illustrated) provided on a back side of the housing 11. The main controller 40 includes the R/W channel 42, a hard disk controller (HDC) 44, a microprocessor (MPU) 46, the memory 47, and the like. The main controller 40 is electrically connected to the VCM 22 and the spindle motor 14 via the driver IC 48. The HDC 44 can be connected to a host computer (host) 45.

The R/W channel 42 is a signal processing circuit of read and write data. The HDC 44 controls data transfer between the host 45 and the R/W channel 42 in accordance with support from the MPU 46. The HDC 44 is electrically connected to, for example, the R/W channel 42, the MPU 46, the memory 47, and the like. The memory 47 includes a volatile memory and a nonvolatile memory. For example, the memory 47 includes a buffer memory including a DRAM, a flash memory, and the like. The memory 47 stores programs and parameters necessary for processing of the MPU 46. The memory 47 further stores a first threshold A1 corresponding to a gap (flying height) between the magnetic disk 12 and the magnetic head 16 and a second threshold A2 corresponding to a positioning error of the magnetic head 16.

The MPU 46 is a main control unit of the magnetic disk device 10, and executes servo control necessary for control of read and write operations and positioning of the magnetic head 16. The MPU 46 includes a write control unit 46a that controls write processing, a read control unit 46b that controls read processing, a heater control unit 46c that controls a power value supplied to the heaters H to be described later, a first detection unit 46d that detects a flying height of the magnetic head 16 with respect to the magnetic disk 12, a second detection unit 46e that detects a positioning error of the magnetic head 16 in a radial direction of the magnetic disk 12, and the like.

The write control unit 46a controls data write processing in accordance with a command from the host 45 or the like. Specifically, the write control unit 46a controls the VCM 22 via the driver IC 48, disposes the magnetic head 16 at a predetermined position on the magnetic disk 12, and writes data.

The read control unit 46b controls data read processing in accordance with a command from the host 45 or the like. Specifically, the read control unit 46b controls the VCM 22 via the driver IC 48, disposes the magnetic head 16 at a predetermined position on the magnetic disk 12, and reads data.

The first detection unit 46d detects the flying height of the magnetic head 16 by a method for measuring the amount of change from a flying height (desired flying height FH) to be a reference specified at the time of manufacturing based on an amplitude change between a primary component (primary harmonic component) and a tertiary component (tertiary harmonic component) of the reproduction signal acquired by the read head 16R. More specifically, the flying height of the magnetic head 16 is detected by measuring the amount of change of the flying height from a change in a ratio between the first harmonic component and the third harmonic component. Note that, the method for detecting the flying height of the first detection unit 46d is not limited to the above method, and may be, for example, a method for detecting the flying height from an amplitude of the primary component of the reproduction signal or a method for detecting the flying height based on an electrostatic capacitance between the magnetic disk 12 and the magnetic head 16. However, since a change in an amplification factor of the head amplifier IC 30 can be absorbed, it is preferable to use the method for measuring the flying height based on the ratio between the primary component and the tertiary component.

The second detection unit 46e detects a positioning error based on a servo sector on the magnetic disk 12. Specifically, the second detection unit 46e detects a positioning error based on an amplitude of a servo signal read from the servo sector by the magnetic head 16.

Here, the method for measuring the flying height of the magnetic head 16 will be described with reference to FIG. 2.

Figure 2:
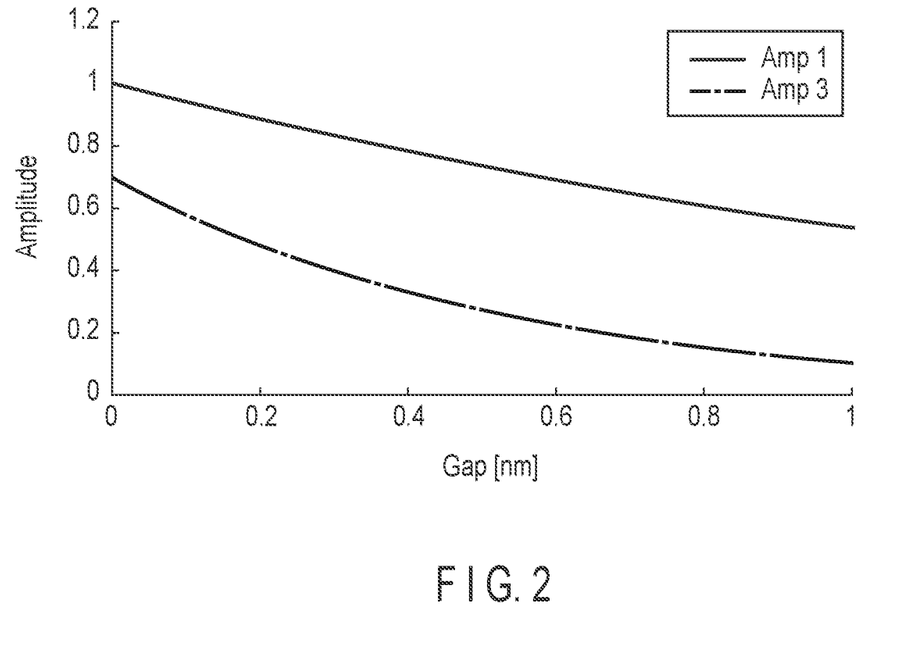
FIG. 2 is a graph representing changes in amplitudes of a primary component and a tertiary component of a reproduction signal with respect to a gap change.

FIG. 2 is a graph representing changes in amplitudes of a primary component and a tertiary component of a reproduction signal with respect to a gap change. In FIG. 2, a vertical axis represents the amplitude of the reproduction signal, and a horizontal axis represents the gap between the magnetic disk 12 and the magnetic head 16. As the gap increases, an amplitude of a primary component Amp1 indicated by a solid line gradually decreases. On the other hand, an amplitude of a tertiary component Amp3 indicated by a dashed dotted line has a larger amount of decrease than the amplitude of the primary component Amp1. For example, when the gap changes from 0.2 nm to 0.4 nm, the amount of decrease of the amplitude of the tertiary component Amp3 is larger than the amount of decrease of the amplitude of the primary component Amp1.

Since there is the above relationship between the primary component Amp1 and the tertiary component Amp3, the flying height of the magnetic head 16 is detected based on a ratio between the amplitude of the primary component Amp1 and the amplitude of the tertiary component Amp3. Accordingly, the change in the amplification factor of the head amplifier IC 30 can be absorbed, and a more accurate flying height can be detected.

Figure 3:
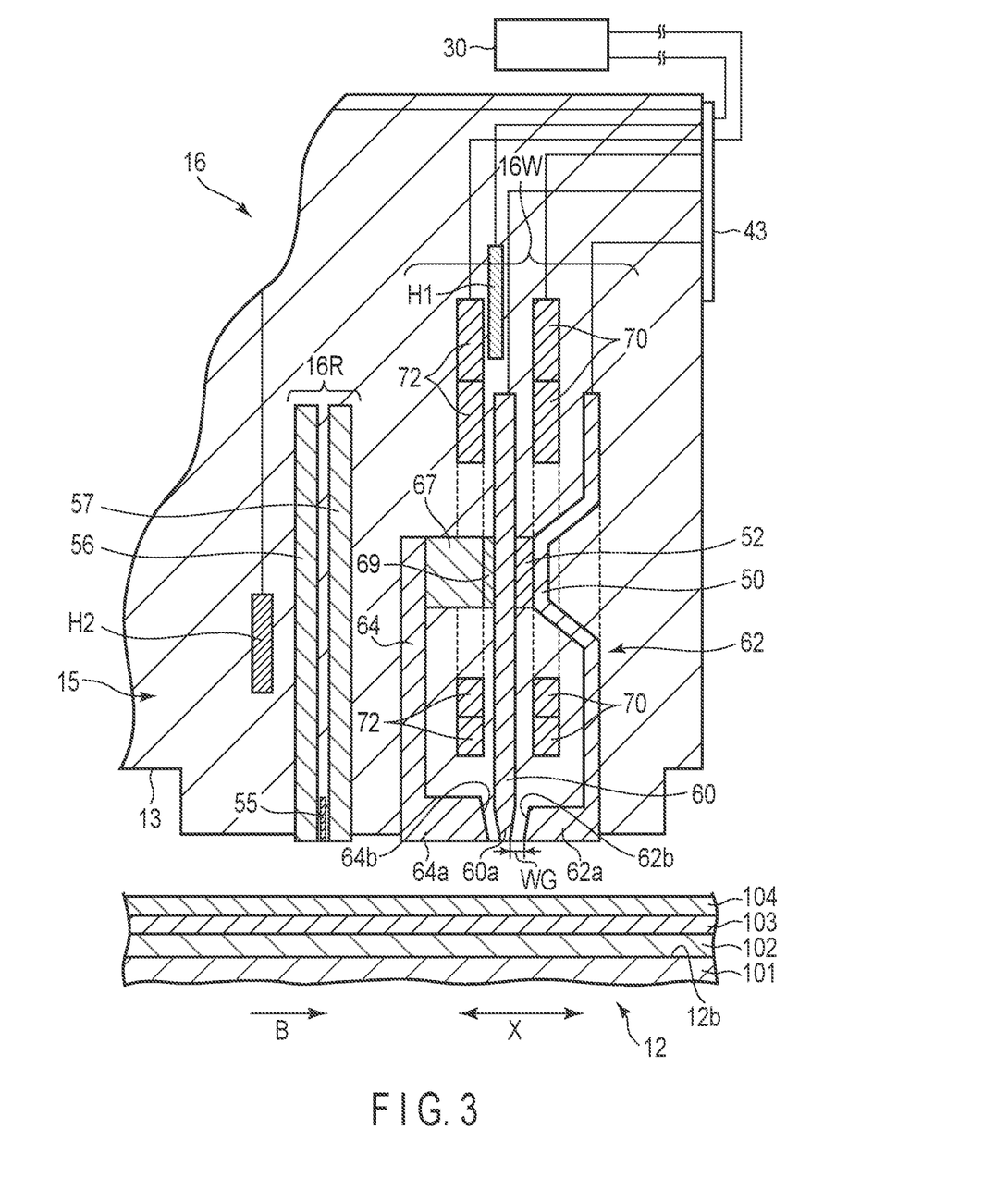
FIG. 3 is an enlarged cross-sectional view illustrating a magnetic head and a magnetic disk of the magnetic disk device according to the embodiment.

FIG. 3 is an enlarged cross-sectional view illustrating the magnetic head 16 and the magnetic disk 12 of the magnetic disk device 10 according to the embodiment. As illustrated in FIG. 3, the magnetic head 16 includes, for example, a write head 16W and a read head 16R formed by a thin film process at ends of the slider 15, and is formed as a separate head. The slider 15 includes an air bearing surface (ABS: head surface) 13 which is a surface facing a recording surface 12b of the magnetic disk 12 in order to float up from a recording surface 12b of the magnetic disk 12. The write head 16W writes data on the magnetic disk 12. The read head 16R reads data recorded on the magnetic disk 12.

The magnetic disk 12 is a perpendicular magnetic recording medium. The magnetic disk 12 is formed in, for example, a disk shape having a diameter of 96 mm (about 3.5 inches), and includes a substrate 101 made of a non-magnetic material. A soft magnetic layer 102 made of a material exhibiting soft magnetic characteristics as an underlayer, a perpendicular magnetic recording layer 103 having magnetic anisotropy in a direction perpendicular to a front surface of the magnetic disk 12 at an upper layer portion, and a protective layer 104 are sequentially stacked on each surface (recording surface 12b) of the substrate 101. The magnetic disk 12 is coaxially fitted to a hub of a spindle motor 21. The magnetic disk 12 is rotated in a direction of an arrow B at a predetermined speed by the spindle motor 21 (see FIG. 1).

The read head 16R includes a magnetoresistive effect element 55, and a first magnetic shield film 56 and a second magnetic shield film 57 disposed to sandwich the magnetoresistive effect element 55 in a longitudinal direction X of the recording track formed in the perpendicular magnetic recording layer 103. The magnetoresistive effect element 55 and each of the magnetic shield films 56 and 57 extend substantially perpendicularly to the ABS 13. Lower end portions (distal end portions) of the magnetoresistive effect element 55 and the magnetic shield films 56 and 57 slightly protrude from the ABS 13.

The write head 16W includes a main magnetic pole 60, a return magnetic pole 62, a non-conductor 52, a leading magnetic pole 64, a second connection portion 67, a first recording coil 70, and a second recording coil 72. The main magnetic pole 60, the return magnetic pole 62, and the leading magnetic pole 64 are made of a highly permeable material. The main magnetic pole 60 and the return magnetic pole 62 constitute a first magnetic core forming a magnetic path, and the main magnetic pole 60 and the leading magnetic pole 64 constitute a second magnetic core forming a magnetic path.

The main magnetic pole 60 extends substantially perpendicular to the ABS 13. A distal end portion 60a of the main magnetic pole 60 on the ABS 13 side is tapered toward the ABS 13, and is formed in a columnar shape having a narrower width than the other portions. The distal end portion 60a of the main magnetic pole 60 slightly protrudes from the ABS 13 of the slider 15.

The return magnetic pole 62 is provided to efficiently close the magnetic path via the soft magnetic layer 102 of the magnetic disk 12 immediately below the main magnetic pole 60. The return magnetic pole 62 is formed in a substantially L-shape, and a distal end portion 62a thereof is formed in an elongated rectangular shape. The distal end portion 62a of the return magnetic pole 62 slightly protrudes from the ABS 13 of the slider 15. The distal end portion 62a has a leading side end face (magnetic pole end face) 62b facing the distal end portion 60a of the main magnetic pole 60 with a write gap WG. The leading side end face 62b extends perpendicularly to the ABS 13 or slightly inclined.

The return magnetic pole 62 includes a first connection portion 50 connected to the main magnetic pole 60. The first connection portion 50 is magnetically connected to an upper portion of the main magnetic pole 60, that is, a portion of the main magnetic pole 60 away from the ABS 13 via the non-conductor 52. The first recording coil 70 is wound around the first connection portion 50, for example, in the first magnetic core. When a signal is written to the magnetic disk 12, a write current is caused to flow through the first recording coil 70. Accordingly, the first recording coil 70 excites the main magnetic pole 60 and causes a magnetic flux to flow through the main magnetic pole 60.

The leading magnetic pole 64 is provided on a leading side of the main magnetic pole 60 to face the main magnetic pole 60. The leading magnetic pole 64 is formed in a substantially L-shape, and a distal end portion 64a on the ABS 13 side is formed in an elongated rectangular shape. The distal end portion 64a slightly protrudes from the ABS 13 of the slider 15. The distal end portion 64a includes a trailing side end face (magnetic pole end face) 64b facing the distal end portion 60a of the main magnetic pole 60 with a gap.

In addition, the leading magnetic pole 64 includes a second connection portion 67 joined to the main magnetic pole 60 at a position separated from the ABS 13. The second connection portion 67 is made of, for example, a soft magnetic material, and is magnetically connected to the upper portion of the main magnetic pole 60, that is, the portion of the main magnetic pole 60 away from the ABS 13 via the non-conductor 69. Accordingly, the second connection portion 67 forms a magnetic circuit together with the main magnetic pole 60 and the leading magnetic pole 64. The second recording coil 72 is wound around the second connection portion 67, for example, and applies a magnetic field to the magnetic circuit.

Further, the magnetic head 16 further includes the heater (thermal actuator) H. In one example, the heaters H include a first heater H1 that adjusts a flying height of the write head 16W and a second heater H2 that adjusts a flying height of the read head 16R. The first heater H1 and the second heater H2 are connected to the head amplifier IC 30 via wires and connection terminals 43, respectively. Power of a desired power value is supplied from the heater power supply circuit 34 of the head amplifier IC 30 to each of the first heater H1 and the second heater H2. Note that, the heaters H are not limited to two heaters of the first heater H1 and the second heater H2, and may be only the first heater H1.

Figure 4:
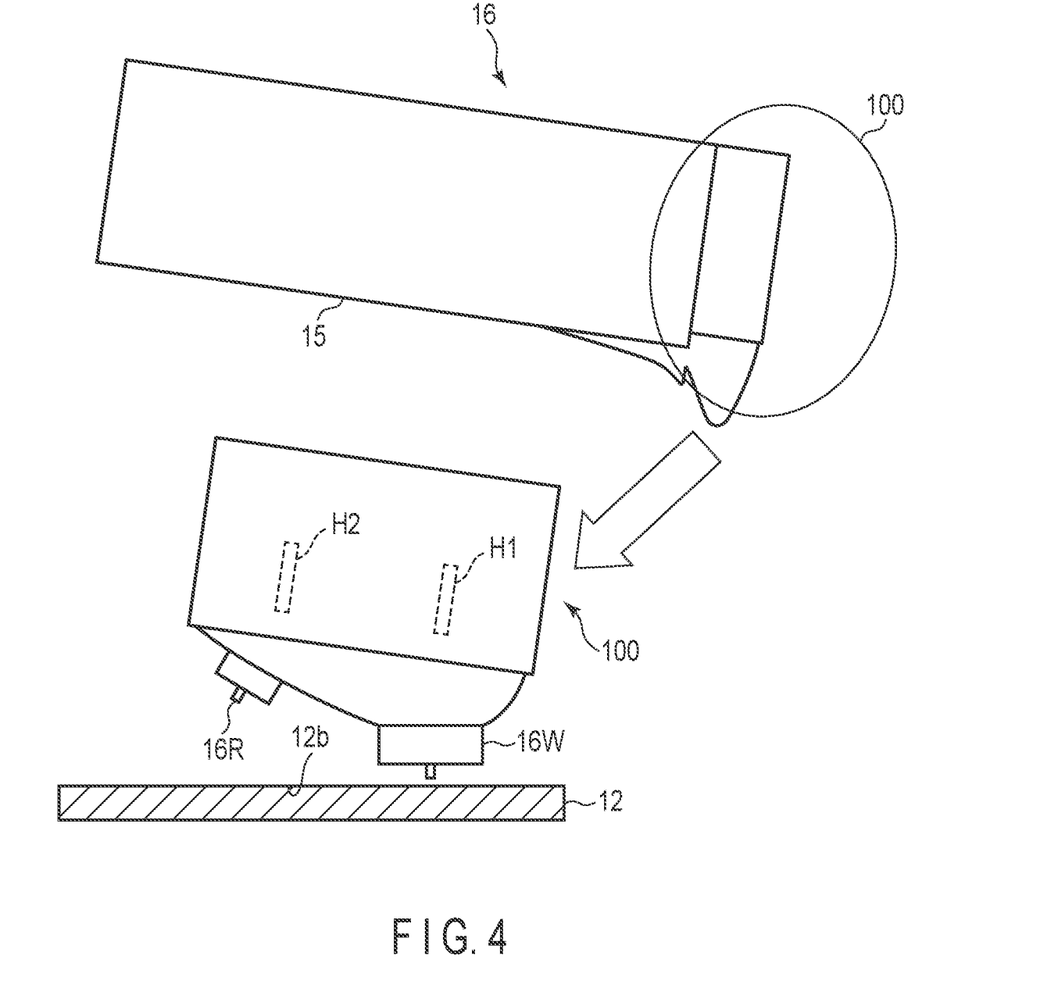
FIG. 4 is a side view illustrating the magnetic head and the magnetic disk of the magnetic disk device according to the embodiment.

FIG. 4 is a side view illustrating the magnetic head 16 and the magnetic disk 12 of the magnetic disk device 10. In FIG. 4, an enlarged cross-sectional view of a head unit 100 of the magnetic head 16 is illustrated at a tip of an arrow. In addition, FIG. 4 illustrates a state where power is supplied to the first heater H1 and the second heater H2.

As illustrated in FIG. 4, when power is supplied to each of the heaters H1 and H2, the first heater H1 adjusts the flying height of the write head 16W by heating a periphery of the write head 16W, and the second heater H2 adjusts the flying height of the read head 16R by heating a periphery of the read head 16R. A power value of the power supplied to the first heater H1 and the second heater H2 is controlled by the MPU 46. Power is supplied to the first heater H1 at least at the time of writing. Power is supplied to the second heater H2 at least at the time of reading.

Figure 5:
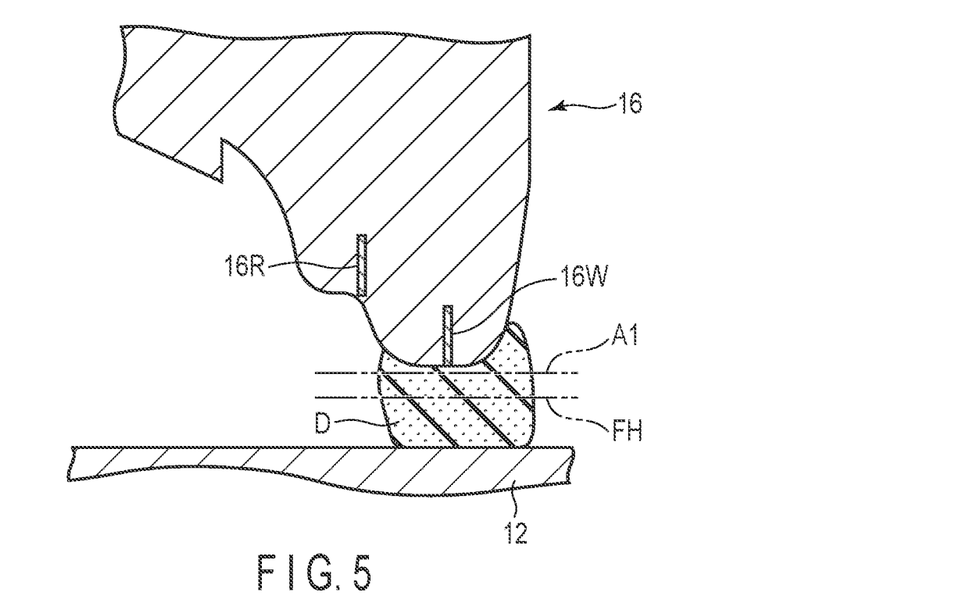
FIG. 5 is a cross-sectional view illustrating the magnetic disk and the magnetic head in a state where the contamination adheres to a write head.

FIG. 5 is a cross-sectional view illustrating the magnetic disk 12 and the magnetic head 16 in a state where contamination D adheres to the write head 16W. Note that, FIG. 5 illustrates a state when data is written, and illustrates a state where power of a predetermined power value is supplied to the first heater H1.

As illustrated in FIG. 5, the contamination D is positioned in the gap between the magnetic disk 12 and the magnetic head 16, and adheres to the write head 16W. The contamination D is, for example, impurities (contamination) mainly including carbon generated on the magnetic disk device 10 due to a manufacturing procedure of the magnetic disk 12, internal gas generation, or the like.

In one example, the flying height of the write head 16W in a state where power is not supplied to the first heater H1 is about 10 nm. In addition, the flying height of the write head 16W at the time of writing, that is, in a state where power of a predetermined power value is supplied to the first heater H1 is about 1 nm. In the magnetic disk device 10 operating at the flying height as described above, in a case where there is the contamination D of about 1 nm to 20 nm on the magnetic disk 12, the contamination D adheres to the write head 16W.

It has been experimentally found that, in a case where the contamination D on the magnetic disk 12 adheres to the magnetic head 16 in a state where power is not supplied to the heaters H, that is, in a state where the flying height is 10 nm, a height of the contamination D adhering to the magnetic head 16 is substantially equal to the flying height of the magnetic head 16.

In a case where power of a predetermined power value is supplied to the first heater H1 from this state to set the flying height of the write head 16W to a desired flying height FH (in one example, 1 nm), the contamination D is pressed against the magnetic disk 12 as illustrated in FIG. 5. At this time, in a case where the contamination D cannot be completely removed by the rotation of the magnetic disk 12, the flying height of the write head 16W becomes larger than the desired flying height FH. Since the contamination D comes into contact with the magnetic disk 12 and the magnetic disk 12 is rotating, a frictional force F is generated between the contamination D and the magnetic disk 12.

Figure 6:
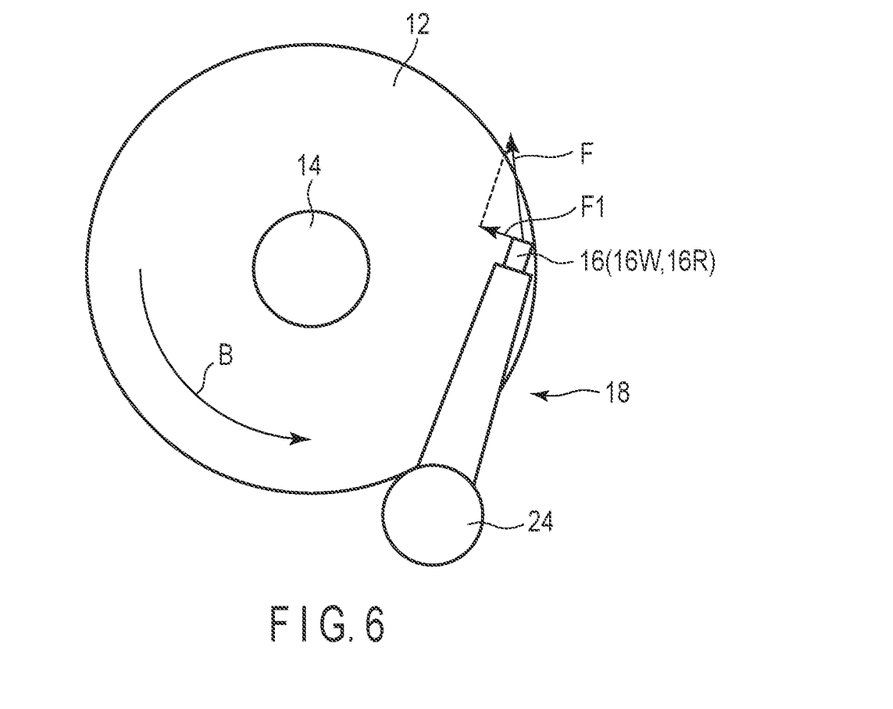
FIG. 6 is a plan view illustrating the magnetic disk and the magnetic head of the magnetic disk device according to the embodiment.

FIG. 6 is a plan view illustrating the magnetic disk 12 and the magnetic head 16 of the magnetic disk device 10 according to the embodiment.

As illustrated in FIG. 6, the magnetic head 16 is positioned on an outer circumferential side in the radial direction of the magnetic disk 12. As illustrated in FIG. 5, in a case where the contamination D adheres to the write head 16W, the frictional force F acts in a rotation direction of the magnetic disk 12. The frictional force F has a component F1 in the same direction as the pivotal direction of the head actuator 18. Thus, a deviation (hereinafter, also simply referred to as a "positioning error") in the radial direction with respect to a target track may occur in the write head 16W due to the frictional force F.

From the above, it is possible to determine whether or not the contamination D adheres to the write head 16W based on whether or not the positioning error is larger than a predetermined value. Note that, when the magnetic disk device 10 receives vibration from an outside, since a positioning error may increase, it is preferable to perform determination together with the flying height of the write head 16W.

Next, a relationship between the amount of change of the flying height and the positioning error in a case where the contamination D adheres to the write head 16W will be described with reference to FIGS. 7 and 8.

Figure 7:
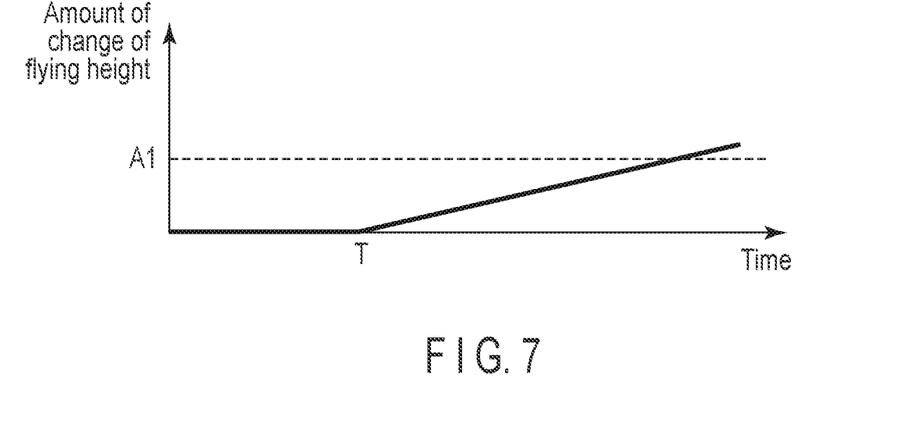
FIG. 7 is a graph representing a change of the write head from a desired flying height in a case where the contamination adheres to the write head.
Figure 8:
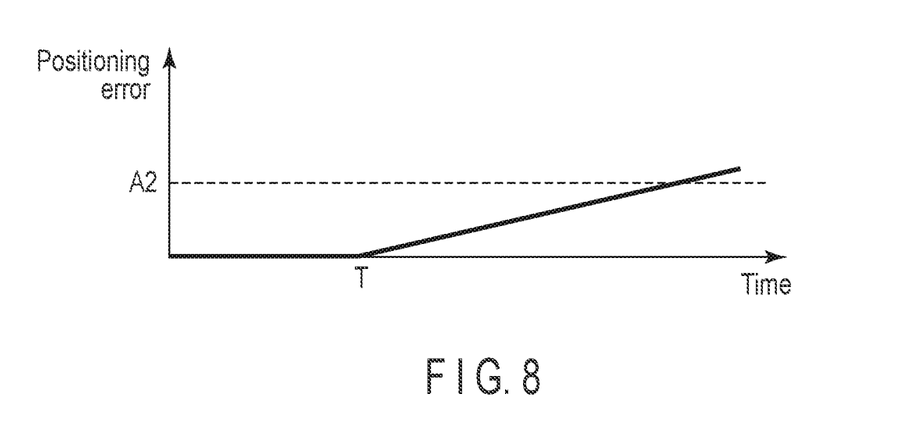
FIG. 8 is a graph representing a change in a positioning error of the write head in a state where the contamination adheres to the write head.

FIG. 7 is a graph representing a change of the write head 16W from a desired flying height in a case where the contamination adheres to the write head 16W. FIG. 8 is a graph representing a change in the positioning error of the write head 16W in a state where the contamination adheres to the write head 16W.

As illustrated in FIG. 7, the flying height of the write head 16W is a desired flying height FH until time T. When the contamination D adheres to the write head 16W at time T, the amount of change in the flying height of the write head 16W starts to increase. On the other hand, as illustrated in FIG. 8, the positioning error of the write head 16W also starts to increase at time T. That is, the amount of change in the flying height and the positioning error start to increase substantially simultaneously.

Thereafter, the amount of change of the flying height gradually increases and exceeds a first threshold A1. In one example, the first threshold A1 is a threshold for the amount of change (increase) from the desired flying height FH, and is, for example, 0.5 nm. Note that, the first threshold A1 may be a threshold for the flying height of the write head 16W from the magnetic disk 12.

On the other hand, the positioning error also gradually increases and exceeds the second threshold A2. In one example, the second threshold A2 is a range in which the write head 16W in the radial direction of the magnetic disk 12 can write data, and is, for example, a position shifted by 20% with respect to a track width.

When the contamination D adheres to the write head 16W as described above, the flying height and the positioning error increase substantially simultaneously. Accordingly, in a case where the amount of change of the flying height exceeds the first threshold A1 and the positioning error exceeds the second threshold A2, it can be determined that the contamination D adheres to the write head 16W. In the magnetic disk device 10 according to the present embodiment, in a case where it is determined that the contamination D adheres to the write head 16W, an operation of removing the contamination D is performed.

Next, an operation of the magnetic head 16 from the detection of the adhesion of the contamination to the removal of the contamination D and writing again will be described with reference to FIGS. 5, 9, and 10.

As illustrated in FIG. 5, the write head 16W is positioned above the first threshold A1. At this time, in a case where the positioning error of the write head 16W exceeds the second threshold A2, an operation of controlling the heater power supply circuit 34 by the heater control unit 46c to remove the contamination D. Specifically, the power value of the power supplied to the first heater H1 is increased. Preferably, the power value of the power supplied to the first heater H1 is increased such that the flying height of the write head 16W becomes less than or equal to half of the desired flying height. In one example, power of a power value at which a flying height of 50% of the desired flying height FH is obtained is supplied to the first heater H1.

Figure 9:
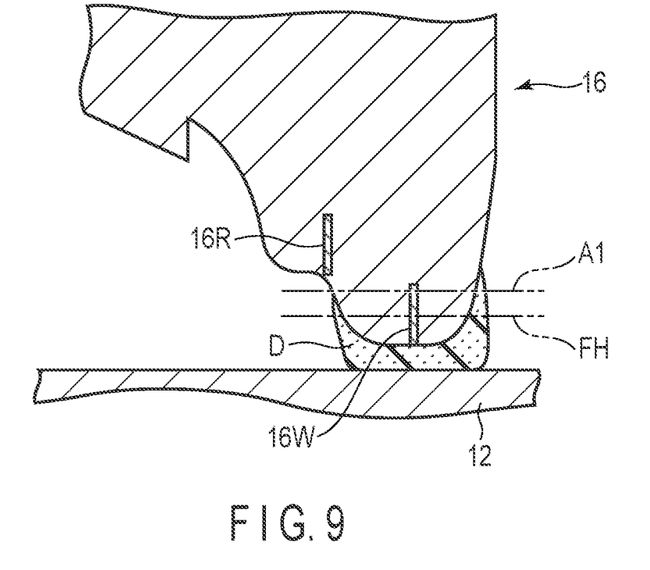
FIG. 9 is a cross-sectional view illustrating the magnetic disk and the magnetic head at the time of a contamination removing operation.

FIG. 9 is a cross-sectional view illustrating the magnetic disk 12 and the magnetic head 16 at the time of a contamination removing operation.

As illustrated in FIG. 9, power of a power value at which a flying height of 50% of the desired flying height FH is obtained is supplied to the first heater H1, and the flying height of the write head 16W is about half of the desired flying height FH. The contamination D is pressed against the rotating magnetic disk 12 and is removed from the write head 16W by the rotation of the magnetic disk 12. Thereafter, the heater control unit 46c controls the heater power supply circuit 34 to return the power value of the power supplied to the first heater H1 to a predetermined power value.

Figure 10:
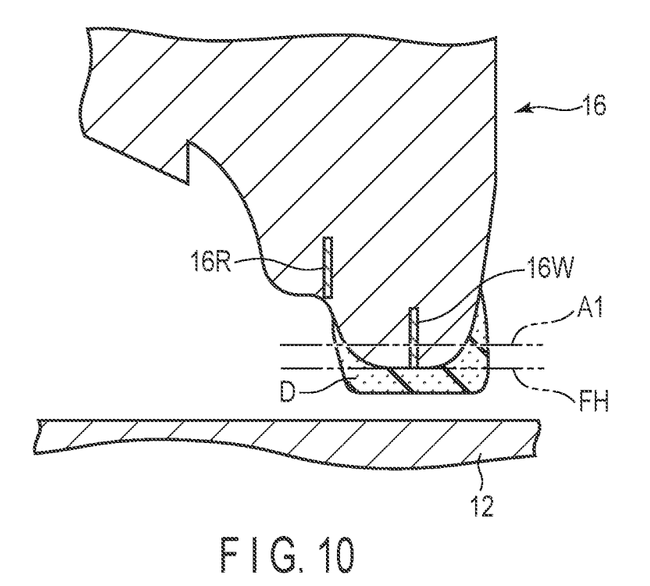
FIG. 10 is a cross-sectional view illustrating the magnetic disk and the magnetic head after contamination removal.

FIG. 10 is a cross-sectional view illustrating the magnetic disk 12 and the magnetic head 16 after contamination removal.

As illustrated in FIG. 10, the contamination D on the magnetic disk 12 side is removed, and the flying height of the write head 16W is the desired flying height FH. In addition, the amount of change from the desired flying height FH of the write head 16W is less than the first threshold A1. In this case, the write control unit 46a controls the recording current supply circuit 32 to write data to the magnetic disk 12.

Hereinafter, a procedure of processing of detecting the adhesion of the contamination D and removing the contamination D will be described.

Figure 11:
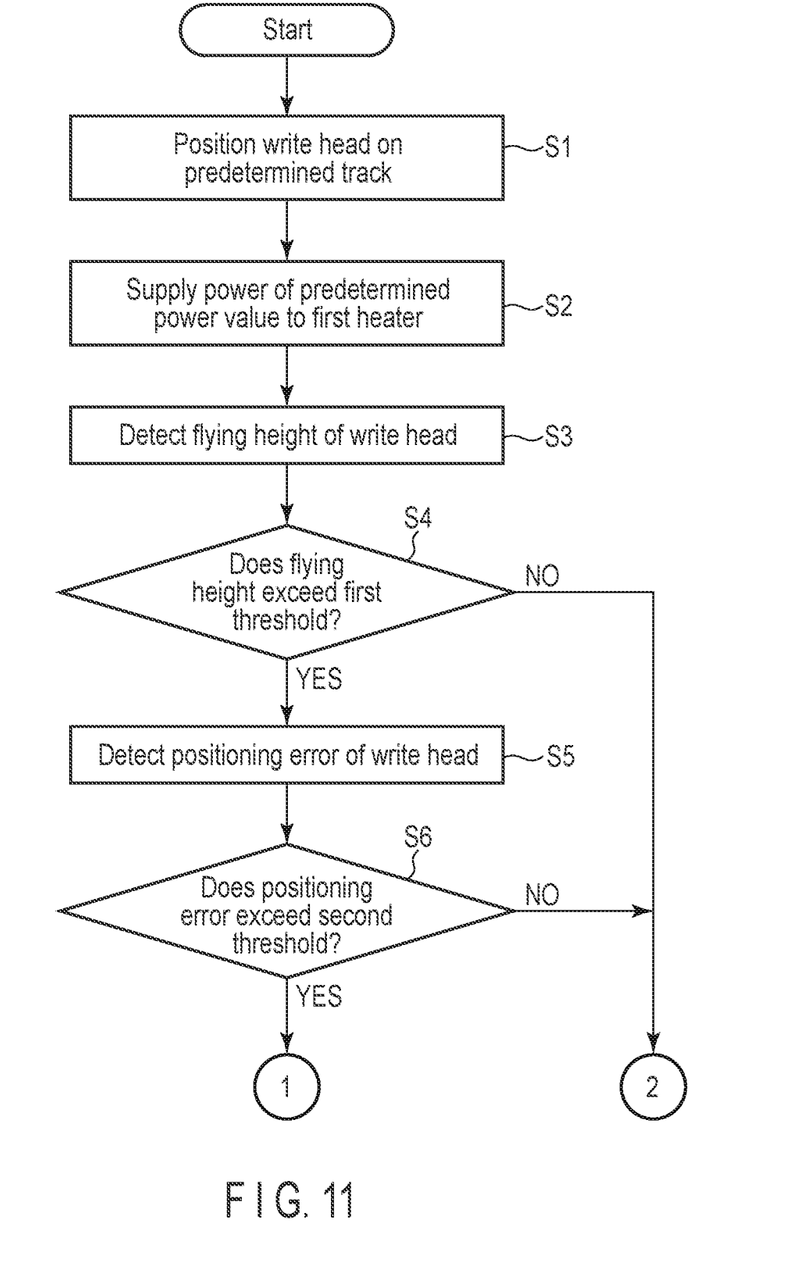
FIG. 11 is a flowchart illustrating an example of a procedure of write processing of the magnetic disk device according to the embodiment.
Figure 12:
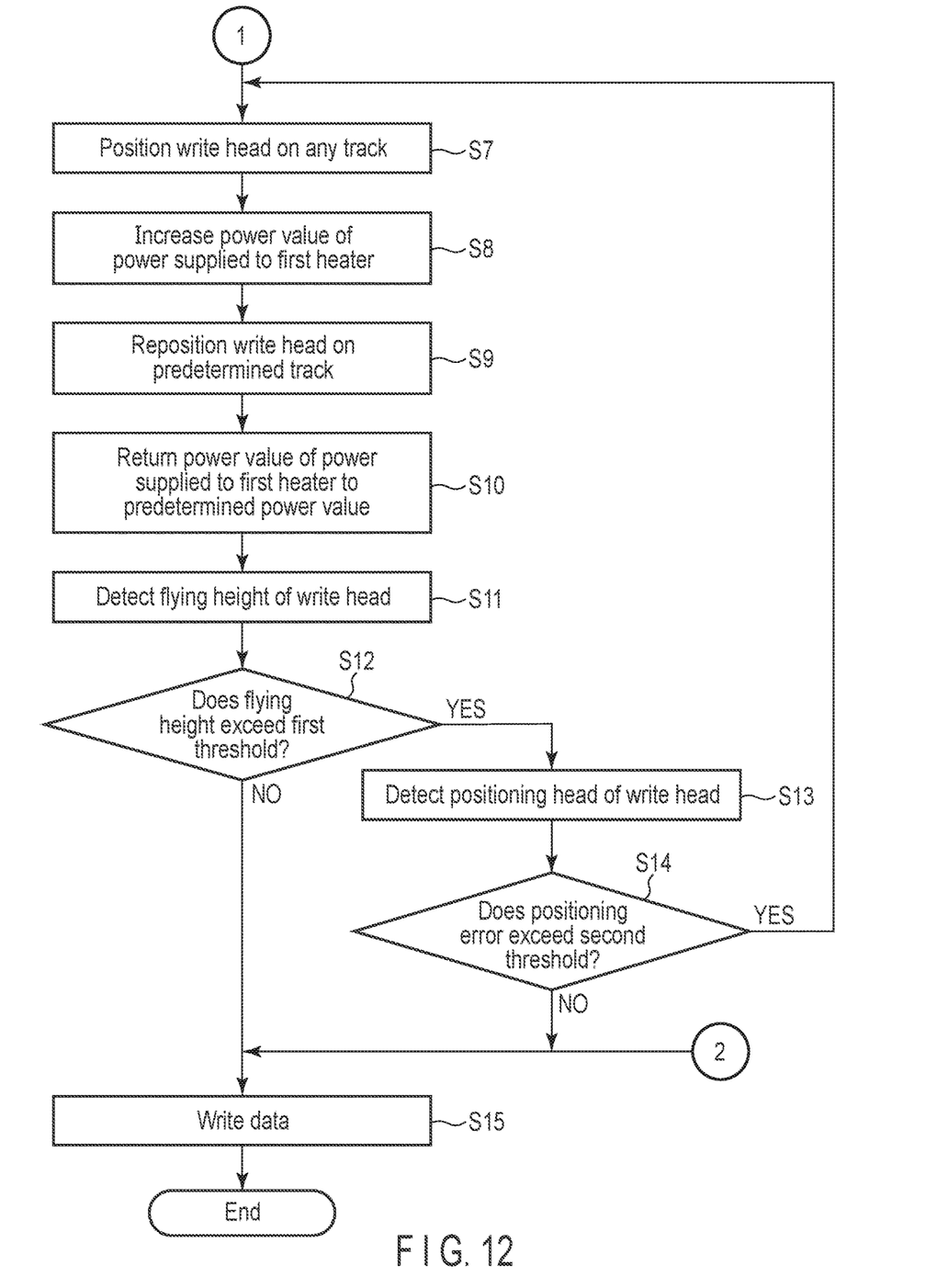
FIG. 12 is a flowchart illustrating an example of a procedure of write processing of the magnetic disk device according to the embodiment, subsequently to FIG. 11.

FIG. 11 is a flowchart illustrating an example of a procedure of write processing of the magnetic disk device 10 according to the embodiment. FIG. 12 is a flowchart illustrating an example of the procedure of the write processing of the magnetic disk device 10 according to the embodiment, subsequently to FIG. 11.

As illustrated in FIGS. 11 and 12, when the write processing is started, the main controller 40 positions the write head 16W on a predetermined track including a sector for writing data (S1), supplies power of a predetermined power value to the first heater H1 (S2), and detects the flying height of the write head 16W by the first detection unit 46d.

Subsequently, the main controller 40 determines whether or not the flying height of the write head 16W exceeds the first threshold A1 (S4), and determines that the contamination D does not adhere to the write head 16W in a case where the flying height does not exceed the first threshold A1, writes data to the magnetic disk 12 by the write head 16W (S15), and ends the write processing.

In a case where the flying height exceeds the first threshold (S4), the main controller 40 detects the positioning error of the write head 16W by the second detection unit 46e (S5), and determines whether or not the positioning error of the write head 16W exceeds the second threshold A2 (S6).

In a case where the positioning error does not exceed the second threshold A2 (S6), the main controller 40 determines that the contamination D does not adhere to the write head 16W, executes step S15, and ends the write processing.

In a case where the positioning error exceeds the second threshold A2 (S6), the main controller 40 determines that the contamination D adheres to the write head 16W, positions the write head 16W on any track (S7), increases the power value of the power supplied to the first heater H1 (S8), and performs the contamination removing operation. The any track described above is, for example, the contamination removing track 12a.

After the contamination removal operation is performed, the main controller 40 repositions the write head 16W on a predetermined track (S9), and returns the power value of the power supplied to the first heater H1 to a predetermined power value (S10).

Thereafter, the main controller 40 detects the flying height of the write head 16W by the first detection unit 46d again (S11), determines whether or not the flying height of the write head 16W exceeds the first threshold A1 (S12), determines that the contamination D does not adhere to the write head 16W in a case where the flying height does not exceed the first threshold A1, executes step S15, and ends the write processing.

In a case where the flying height exceeds the first threshold A1 (S12), the main controller 40 detects the positioning error of the write head 16W by the second detection unit 46e (S13), and determines whether or not the positioning error of the write head 16W exceeds the second threshold A2 (S14).

In a case where the positioning error does not exceed the second threshold A2 (S14), the main controller 40 determines that the contamination D does not adhere to the write head 16W, executes step S15, and ends the write processing.

In a case where the positioning error exceeds the second threshold A2 (S14), the main controller 40 determines that the contamination D adheres to the write head 16W, and executes kinds of processing from step S7 to step S14 again.

Note that, in the procedure of the write processing described above, steps S3 and S4 may be exchanged with steps S5 and S6. For example, in FIG. 11, after step S2 is executed, steps S5 and S6 may be executed, and in a case where the positioning error exceeds the second threshold A2, steps S3 and S4 may be executed.

Similarly, steps S11 and S12 may be exchanged with steps S13 and S14. For example, in FIG. 12, after step S10 is executed, step S13 and step S14 may be executed, and in a case where the positioning error exceeds the second threshold A2, step S11 and step S12 may be executed.

As described above, the magnetic disk 12 may not include the contamination removing track 12a. In this case, step S7 and step S9 may not be executed in the procedure of the write processing. For example, in FIGS. 11 and 12, processing of executing step S6, executing step S8 in a case where the positioning error exceeds the second threshold A2, and executing step S10.

Effects of the embodiment will be described.

In accordance with the magnetic disk device 10 according to the present embodiment, the main controller 40 detects the flying height of the write head 16W and the positioning error of the write head 16W when data is written to the magnetic disk 12 by the write head 16W, and increases the power value of the power supplied to the first heater H1 in a case where the flying height of the write head 16W exceeds the first threshold A1 and the positioning error of the write head 16W exceeds the second threshold A2.

Accordingly, the contamination D adhering to the write head 16W is removed, and thus, it is possible to obtain the magnetic disk device 10 capable of suppressing deterioration in write performance and improving the accuracy of recording.

The first detection unit 46d detects the flying height of the write head 16W from the ratio between the primary component and the tertiary component of the reproduction signal. Accordingly, since the flying height of the write head 16W can be detected more accurately, it is possible to suppress the write head 16W from coming into contact with the magnetic disk 12 at the time of the contamination removing operation.

In a case where the magnetic disk 12 includes the contamination removing track 12a, the main controller 40 performs the contamination removing operation after the write head 16W is positioned on the contamination removing track 12a. Accordingly, demagnetization due to wear in a region where data is written can be prevented.

In a case where the movement of the magnetic head 16 is limited by the stopper ST, the write head 16W is positioned on the contamination removing track 12a. Accordingly, the write head 16W can be positioned on the contamination removing track 12a only by pressing the magnetic head 16 against the stopper ST, that is, without performing positioning adjustment by servo.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk;
a magnetic head that includes a write head configured to write data to the magnetic disk, a read head configured to read data from the magnetic disk, and a heater configured to adjust a flying height of the write head; and
a controller that includes a first detection unit configured to detect the flying height of the write head, a second detection unit configured to detect a positioning error of the magnetic head with respect to a track of the magnetic disk, and a memory configured to store a first threshold and a second threshold,
the controller:
supplying power of a predetermined power value to the heater such that the flying height of the write head becomes a desired flying height when data is written to the magnetic disk by the write head,
detecting the flying height of the write head by the first detection unit,
detecting the positioning error of the write head by the second detection unit, and
increasing the power value of the power supplied to the heater in a case where the flying height of the write head exceeds the first threshold and the positioning error of the write head exceeds the second threshold,
wherein the controller further:
returns the power value of the power supplied to the heater to a desired power value,
detects the flying height of the write head by the first detection unit,
detects the positioning error of the write head by the second detection unit, and
writes data to the magnetic disk by the write head in a case where the flying height of the write head does not exceed the first threshold or a case where the positioning error of the write head does not exceed the second threshold.

2. The magnetic disk device according to claim 1, wherein the first detection unit detects the flying height of the write head from a ratio between a primary component and a tertiary component of a reproduction signal obtained by the read head.

* * * * *